(12) United States Patent
Kitamura et al.

(10) Patent No.: US 10,712,602 B2
(45) Date of Patent: Jul. 14, 2020

(54) OPTICAL DRIVE

(71) Applicant: PANASONIC INTELLECTUAL PROPERTY MANAGEMENT CO., LTD., Osaka (JP)

(72) Inventors: Kazuki Kitamura, Osaka (JP); Hiroshi Fukushima, Osaka (JP); Norihiro Ito, Osaka (JP); Hirofumi Kubota, Osaka (JP); Masuyuki Ota, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/325,648

(22) PCT Filed: Jun. 13, 2017

(86) PCT No.: PCT/JP2017/021719
§ 371 (c)(1),
(2) Date: Feb. 14, 2019

(87) PCT Pub. No.: WO2018/037677
PCT Pub. Date: Mar. 1, 2018

(65) Prior Publication Data
US 2019/0196255 A1 Jun. 27, 2019

(30) Foreign Application Priority Data
Aug. 24, 2016 (JP) .................. 2016-164186

(51) Int. Cl.
*G02F 1/1335* (2006.01)
*G02F 1/1334* (2006.01)
(Continued)

(52) U.S. Cl.
CPC ...... *G02F 1/133502* (2013.01); *E06B 3/6722* (2013.01); *G02F 1/1334* (2013.01);
(Continued)

(58) Field of Classification Search
None
See application file for complete search history.

(56) References Cited

U.S. PATENT DOCUMENTS

2006/0238694 A1* 10/2006 Chen ................. G02F 1/133512
349/156
2018/0067367 A1* 3/2018 Yu .................... G02F 1/133514

FOREIGN PATENT DOCUMENTS

JP 2007-133187 5/2007

OTHER PUBLICATIONS

Official Communication issued in International Bureau of WIPO Patent Application No. PCT/JP2017/021719, dated Sep. 5, 2017.

* cited by examiner

*Primary Examiner* — Richard H Kim
(74) *Attorney, Agent, or Firm* — Greenblum & Bernstein, P.L.C.

(57) ABSTRACT

Optical device includes first substrate being light transmissive, second substrate opposing first substrate and being light transmissive, and light distribution layer disposed between first substrate and second substrate and distributing incident light. Light distribution layer includes uneven structure portion having a plurality of projections repeated in the z axial direction parallel to the main face of first substrate, and optical medium portion containing a birefringent material and disposed to fill a plurality of recesses that are spaces between the plurality of projections. Light blocking component configured to block at least part of incident light is disposed in the plurality of recesses.

10 Claims, 14 Drawing Sheets

(51) Int. Cl.
*E06B 3/67* (2006.01)
*G02F 1/1339* (2006.01)
*G02F 1/1343* (2006.01)

(52) U.S. Cl.
CPC ...... *G02F 1/13394* (2013.01); *G02F 1/13439* (2013.01); *G02F 1/133504* (2013.01); *G02F 1/133512* (2013.01); *G02F 1/134309* (2013.01); *G02F 2001/13398* (2013.01); *G02F 2203/01* (2013.01)

ABSTRACT## OPTICAL DRIVE

TECHNICAL FIELD

The present invention relates to an optical device.

BACKGROUND ART

Optical devices are known that can change the transmission state of external light entering from outside, such as sunlight.

For example, PTL 1 discloses a reflection dimmer that can be used in a window material for architectural structures. The reflection dimmer disclosed in PTL 1 includes a pair of transparent electrodes and an optical function layer retained between the transparent electrodes. The optical function layer includes an irregular transparent surface layer having a plurality of recesses in the surface, and a liquid crystal material filled in each recess. The reflection dimmer can refract or reflect incident light or allow incident light to directly pass through by changing a difference in refractive index between the liquid crystal material and the irregular transparent surface layer in response to an electric field applied between the transparent electrodes.

CITATION LIST

Patent Literature

PTL 1: Japanese Unexamined Patent Application Publication No. 2007-133187

SUMMARY OF THE INVENTION

Technical Problem

The above-described conventional reflection dimmer, however, suffers from light scattering occurring at the interface of the irregular transparent surface layer. For example, when the reflection dimmer is used in an window of an architectural structure, stripes of light appear in the longitudinal (vertical) direction when sunlight enters the reflection dimmer. This causes a person inside the architectural structure to be locally dazzled by the view from the window and makes the outside of the window less viewable, thus impairing the function of the window.

In view of this, it is an object of the present invention to provide an optical device that can reduce local glare.

Solution to Problem

To achieve the above-described object, the optical device according to an embodiment of the present invention includes a first substrate being light transmissive, a second substrate opposing the first substrate and being light transmissive, and a light distribution layer disposed between the first substrate and the second substrate and distributing incident light. The light distribution layer includes a first uneven structure portion having a plurality of first projections repeated in a first direction parallel to a main face of the first substrate, and an optical medium portion containing a birefringent material and disposed to fill a plurality of recesses that are spaces between the plurality of first projections, and a light blocking component that blocks at least part of incident light is disposed in the plurality of recesses.

Advantageous Effect of Invention

The optical device according to the present invention can reduce local glare.

DESCRIPTION OF EXEMPLARY EMBODIMENTS

Figure 1:
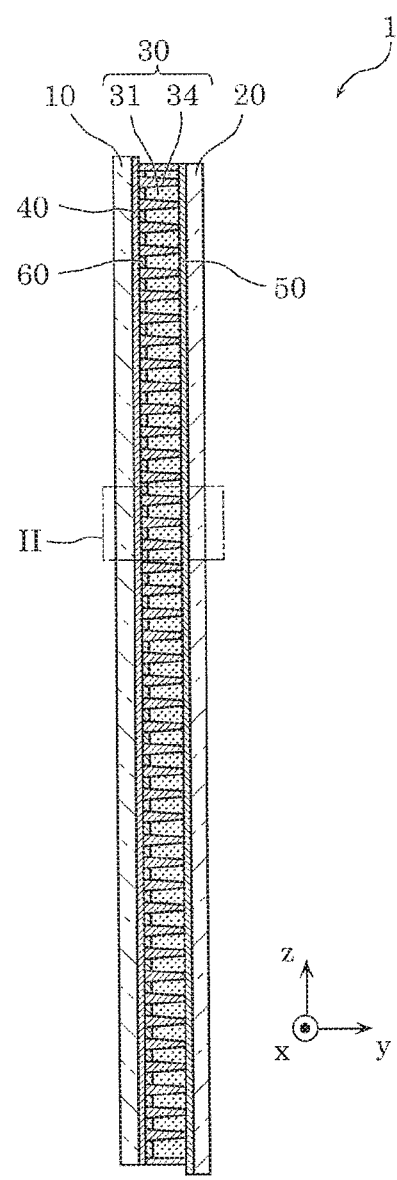
FIG. 1 is a sectional view of an optical device according to Embodiment 1.

Hereinafter, optical devices according to embodiments of the present invention will be described in detail with reference to the drawings. Note that every embodiment described below shows a specific example of the present invention. Thus, numerical values, shapes, materials, structural elements, the arrangement and connection of the structural elements, steps, the order of steps, and so on shown in the following embodiments are mere examples, and are not intended to hunt the present invention. Accordingly, among the structural elements in the following embodiments, structural elements not recited in an independent claim indicating the broadest concept of the present invention are described as arbitrary structural elements.

The figures are schematic diagrams and are not necessarily precise illustrations. Therefore, for example, scale reduction or the like in the figures are not necessarily the same. Structural elements that are substantially the same in the figures are given the same reference numerals, and redundant descriptions thereof have been omitted or simplified.

In the specification and drawings of the present invention, x, y, and z axes indicate three axes in a three-dimensional orthogonal coordinate system. In each embodiment, the z axial direction is assumed to be the vertical direction, and the direction perpendicular to the z axis (the direction parallel to an xy plane) is assumed to be the horizontal direction. Note that the positive direction of the z axis is assumed to be in the vertical upward direction. The term "thickness direction" as used in the specification of the present invention refers to the direction along the thickness of the optical device, i.e., the direction perpendicular to the main faces of a first substrate and a second substrate, and the language "when viewed in plan view" refers to viewing from the direction perpendicular to the main faces of the first or second substrate.

Embodiment 1

Configuration

Figure 2:
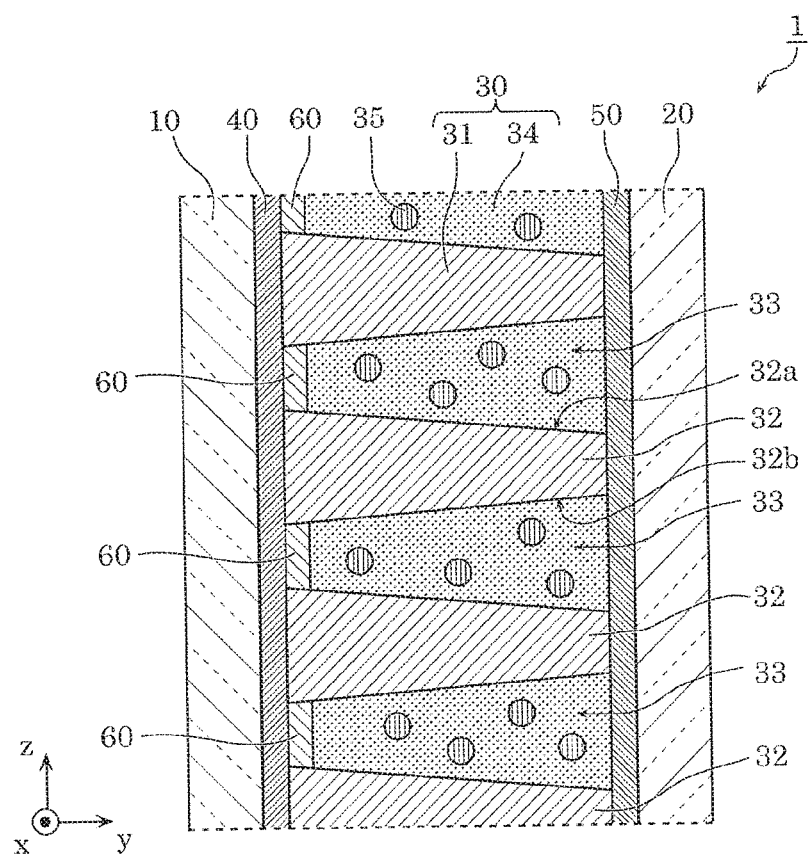
FIG. 2 is an enlarged sectional view of the optical device according to Embodiment 1.

First, a configuration of optical device 1 according to Embodiment 1 will be described with reference to FIGS. 1 and 2. FIG. 1 is a sectional view of optical device 1 according to the present embodiment. FIG. 2 is an enlarged sectional view of optical device 1 according to the present embodiment, and is an enlarged sectional view of region II surrounded by the dashed dotted line in FIG. 1.

Optical device 1 is a light control device that controls light incident on optical device 1. Specifically, optical device 1 is a light distribution element that can change the travel direction of light incident on optical device 1 (i.e., distribute the light) and emit that light.

As illustrated in FIGS. 1 and 2, optical device 1 is configured to transmit incident light, and includes first substrate 10, second substrate 20, light distribution layer 30, first electrode 40, second electrode 50, and light blocking component 60.

Note that an adhesion layer for allowing first electrode 40 to adhere to uneven structure portion 31 of light distribution layer 30 may be provided on the face of first electrode 40 on the side of light distribution layer 30. The adhesion layer is made of, for example, a light-transmittable adhesive.

Optical device 1 is configured such that first electrode 40, light distribution layer 30, and second electrode 50 are arranged in this order in the thickness direction between first substrate 10 and second substrate 20 that are paired with each other. Light blocking component 60 is provided in recesses 33 of uneven structure portion 31 of light distribution layer 30.

Hereinafter, each structural member of optical device 1 will be described in detail with reference to FIGS. 1 and 2.

First Substrate and Second Substrate

First substrate 10 and second substrate 20 are light-transmissive substrates having light transmission properties.

For example, glass substrates or resin substrates can be used as first substrate 10 and second substrate 20.

Examples of the material for glass substrates include soda-lime glass, no alkali glass, and high refractive index glass. Examples of the material for resin substrates include resin materials such as polyethylene terephthalate (PET), polyethylene naphthalate (PEN), polycarbonate (PC), acrylic (PMMA), and epoxy. Glass substrates have the advantages of high light transmittance and low moisture permeability. On the other hand, resin substrates have the advantage of being less scattered upon breakage.

First substrate 10 and second substrate 20 may be made of the same material or may be made of different materials. First substrate 10 and second substrate 20 are not limited to rigid substrates and may be flexible substrates having flexibility. In the present embodiment, first substrate 10 and second substrate 20 are transparent resin substrates made of a PET resin.

Second substrate 20 is a counter substrate that opposes first substrate 10 and is disposed at a position opposing first substrate 10. First substrate 10 and second substrate 20 are bonded with a sealing resin such as an adhesive formed in a frame form along the outer peripheral edges of the substrates.

Note that first substrate 10 and second substrate 20 have, for example, a square or rectangular shape when viewed in plan view, but the shape of the substrates is not limited to this example. The substrates may have a circular shape or a polygonal shape other than a quadrangle, and any shape may be adopted.

Light Distribution Layer

As illustrated in FIGS. 1 and 2, light distribution layer 30 is disposed between first substrate 10 and second substrate 20. Light distribution layer 30 is light transmissive and transmit incident light. Light distribution layer 30 also distributes incident light. That is, light distribution layer 30 changes the travel direction of light passing through light distribution layer 30.

Light distribution layer 30 includes uneven structure portion 31 (uneven layer) and optical medium portion 34 (optical medium layer) containing a birefringent material.

Uneven structure portion 31 is one example of a first uneven structure portion having a plurality of projections 32 and a plurality of recesses 33. Specifically, uneven structure portion 31 is an uneven structure configured by a plurality of micro- or nano-order size projections 32. Spaces between the plurality of projections 32 correspond to the plurality of recesses 33. That is, the space between two adjacent projections 32 corresponds to one recess 33.

The plurality of projections 32 is one example of a plurality of first projections that are repeated in the z axial direction (first direction) parallel to the main face of first substrate 10 (face on which first electrode 40 is provided). That is, the z axial direction according to the present embodiment corresponds to the direction of arrangement of the plurality of projections 32.

In the present embodiment, the plurality of projections 32 is formed in a stripe shape. Each of the plurality of projections 32 is a long projection that extends in the x axial direction (second direction). Specifically, the plurality of projections 32 each has a long generally rectangular prism shape that is trapezoidal in cross section and extends in the x axial direction, and is arranged at regular intervals in the z axial direction. Each of the plurality of projections 32 has the same shape, but they may have different shapes.

The height (length in the y axial direction) of each of the plurality of projections 32 is in the range of, for example, 100 nm to 100 µm, but is not limited to this. The spacing between adjacent projections 32, i.e., the width (in the z axial direction) of each recess 33 is in the range of, for example, 0 to 100 µm. That is, two adjacent projections 32 may be disposed at a predetermined interval without contact, or may be disposed in contact with each other. Note that the spacing between adjacent projections 32 is not limited to the range of 0 to 100 µm.

Each of the plurality of projections 32 has a pair of side faces 32a and 32b. As illustrated in FIG. 2, paired side faces 32a and 32b are faces intersecting in the z axial direction. In the present embodiment, each of the plurality of projections 32 has a tapered shape in cross section that tapers down in a direction from first substrate 10 to second substrate 20 (thickness direction). Each of the pair of side faces 32a and 32b is an inclined face that is inclined at a predetermined angle of inclination toward to the thickness direction, and the spacing between the pair of side faces 32a and 32b (the width (or length in the z axial direction) of projection 32) gradually decreases from first substrate 10 toward second substrate 20.

Out of the pair of side faces 32a and 32b, side face (first side face) 32a is, for example, a side face on the vertically upper side (upper side face). Out of the pair of side faces 32a and 32b, side face (second side face) 32b is, for example, a side face on the vertically lower side (lower side face).

For example, a light-transmittable resin material such as an acrylic resin, an epoxy resin, and a silicone resin can be used as the material for projections 32. Projections 32 can be formed by techniques such as mold forming or nano-imprinting.

Uneven structure portion 31 can be formed by, for example, mold embossing of a trapezoidal uneven structure in cross section, using an acrylic resin having a refractive index of 1.5. Projections 32 have a height of, for example, 10 µm, and the plurality of projections 32 is arranged in line in the z axial direction at equal intervals of 2 µm. The root of each projection 32 (lower base of the trapezoid) has a thickness of, for example, 10 µm. Note that the cross-sectional shape of projections 32 is not limited to a trapezoid, and may be a triangle.

The birefringent material for optical medium portion 34 is, for example, a liquid crystal containing liquid crystal molecules 35 having birefringence. For example, a nematic liquid crystal or cholesteric liquid crystal in which liquid crystal molecules 35 are rod-like molecules can be used as an example of such a liquid crystal. Also, birefringent liquid crystal molecules 35 have, for example, an ordinary refractive index (no) of 1.5 and an extraordinary refractive index (ne) of 1.7. In the present embodiment, optical medium portion 34 is a liquid crystal layer made of a liquid crystal containing liquid crystal molecules 35.

Optical medium portion 34 is disposed so as to fill the plurality of recesses 33 of uneven structure portion 31. Optical medium portion 34 is disposed so as to fill clearance between first electrode 40 and second electrode 50. For example, when projections 32 are spaced from second electrode 50, optical medium portion 34 is disposed so as to fill clearance between projections 39 and second electrode 50.

In the present embodiment, optical medium portion 34 functions as a refractive index adjustment layer that can adjust a refractive index in the visible light range upon application of an electric field. Specifically, since optical medium portion 34 is made of a liquid crystal containing liquid crystal molecules 35 that are responsive to an electric field, the application of an electric field to light distribution layer 30 changes the orientation of liquid crystal molecules 35 and changes the refractive index of optical medium portion 34.

Upon application of a voltage between first electrode 40 and second electrode 50, an electric field is applied to light distribution layer 30. Therefore, the electric field that is applied to light distribution layer 30 can be changed by controlling the voltage to be applied to first electrode 40 and second electrode 50. This changes the orientation of liquid crystal molecules 35 and changes the refractive index of optical medium portion 34. That is, the refractive index of optical medium portion 34 can be changed by applying voltage to first electrode 40 and second electrode 50.

At this time, when projections 32 have a refractive index of 1.5, a positive-type liquid crystal having an ordinary refractive index of 1.5 and an extraordinary refractive index of 1.7 can be used as the material for optical medium portion 34.

Note that FIG. 2 illustrates a state in which no voltage is applied (the same applies to FIG. 3A, which will be described later), and liquid crystal molecules 35 are oriented such that their major axes become parallel to the x axis. When a voltage is applied between first electrode 40 and second electrode 50, liquid crystal molecules 35 are oriented such that their major axes become parallel to the y axis (see FIG. 3B, which will be described later).

Note that an electric field may be applied by alternating-current power to optical medium portion 34, or may be applied thereto by direct-current power. In the Case of alternating-current power, the voltage waveform may be sinusoidal or may be rectangular.

Optical medium portion 34 is formed by, for example, injecting a positive-type liquid crystal by vacuum injection while the outer peripheral edges of first substrate 10 where first electrode 40 and uneven structure portion 31 are formed and second substrate 20 where second electrode 50 is formed are sealed with a sealing resin.

First Electrode and Second Electrode

As illustrated in FIGS. 1 and 2, first electrode 40 and second electrode 50 are electrically paired and configured to be able to apply an electric field to light distribution layer 30. Note that first electrode 40 and second electrode 50 are paired not only electrically, but also in terms of arrangement, and disposed so as to face each other. Specifically, first electrode 40 and second electrode 50 are disposed so as to sandwich light distribution layer 30 therebetween.

First electrode 40 and second electrode 50 are light transmissive and transmit incident light. First electrode 40 and second electrode 50 are, for example, transparent conductive layers. Examples of the material for transparent conductive layers include transparent metal oxides such as indium tin oxide (ITO) and indium zinc oxide (IZO), conductor-containing resins made of resins containing conductors, such as silver nanowire and conductive particles, and thin metal films such as a thin silver film. Note that first electrode 40 and second electrode 50 may have a single-layer structure of one of such materials, or may have a laminated structure of such materials (e.g., a laminated structure of a transparent metal oxide and a thin metal film). In the present embodiment, first electrode 40 and second electrode 50 are each ITO having a thickness of 100 nm.

First electrode 40 is disposed between first substrate 10 and light distribution layer 30. Specifically, first electrode 40 is formed on the face of first substrate 10 on the side of light distribution layer 30.

On the other hand, second electrode 50 is disposed between light distribution layer 30 and second substrate 20.

Specifically, second electrode 50 is formed on the face of second substrate 20 on the side of light distribution layer 30.

Note that first electrode 40 and second electrode 50 are preferably configured electrically connectable to an external power supply. For example, an electrode pad or the like for connecting the electrode to an external power supply may be drawn from each of first electrode 40 and second electrode 50 and formed on first substrate 10 and second substrate 20.

First electrode 40 and second electrode 50 are each formed by, for example, evaporation or sputtering.

Light Blocking Component

Light blocking component 60 blocks part of incident light. Note that the term "light blocking" as used in the specification of the present invention refers to not only completely blocking incident light but also blocking only part of incident light and transmitting the remaining light. For example, the term "light blocking" refers to a state in which the interruption of light is dominant over light transmission. Specifically, the transmittance of light blocking component 60 to visible light is lower than 50%, preferably less than or equal to 20%, and may be less than or equal to 10%.

In the present embodiment, light blocking component 60 is provided at the bottom of each recess 33. Specifically, like uneven structure portion 31, light blocking component 60 is formed in a stripe shape extending in the x axial direction. In the present embodiment, light blocking component 60 is provided in every recess 33, but the present invention is not limited to this example. For example, light blocking component 60 may be provided at intervals of n recesses 33 (where n is a natural number greater than or equal to 1) in the z axial direction.

Light blocking component 60 contains a black pigment. Examples of the black pigment include carbon-based black pigments such as carbon black and oxide-based black pigments. For example, a water-based black ink is applied to the inside of recesses 33 by a bar coater and then dried in a 100° C. environment. Thereafter, an oxide film is formed on the surface by sputtering to form light blocking component 60.

The oxide film (not shown) has a function of suppressing the mixture of light blocking component 60 with optical medium portion 34 (liquid crystal). The oxide film also functions as an orientation membrane for liquid crystal molecules 35. The oxide film is, for example, a silicon oxide film ($SiO_2$).

The transmittance of light blocking component 60 can be adjusted the density of the water-based black ink to be used (specifically, the amount of black pigment) and the number of times ink is applied. Specifically, the transmittance of light blocking component 60 can be reduced (i.e., less light will be transmitted) by increasing the density of the ink or increasing the number of times ink is applied.

The width (in the z axial direction) of light blocking component 60 corresponds to the width of each recess 33, i.e., the distance between adjacent projections 32. For example, the width of light blocking component 60 is in the range of 0 to 100 μm. The width of light blocking component 60 is smaller than the thickness of the root of each projection 32 (lower base of the trapezoid). Specifically, the width of light blocking component 60 is less than or equal to one fifth of the thickness of the root of each projection 32, e.g., 2 μm.

In the present embodiment, light blocking component 60 is formed to approximately a uniform film thickness. The film thickness (in the y direction) of light blocking component 60 is, for example, in the range of 200 nm to 1 μm.

Note that light blocking component 60 does not necessarily have to be black in color. For example, light blocking component 60 may be formed by drying solvent ink containing a colored pigment. The drying may be air drying.

Optical State of Optical Device

Next, the optical state of optical device 1 according to the present embodiment will be described.

Optical device 1 has two optical states (operation modes) depending on the application state of an electric field to light distribution layer 30. Specifically, optical device 1 has a light distribution mode of changing the travel direction of incident light and a light transmission mode of allowing incident light to directly pass through (without changing the travel direction thereof).

Figure 3A:
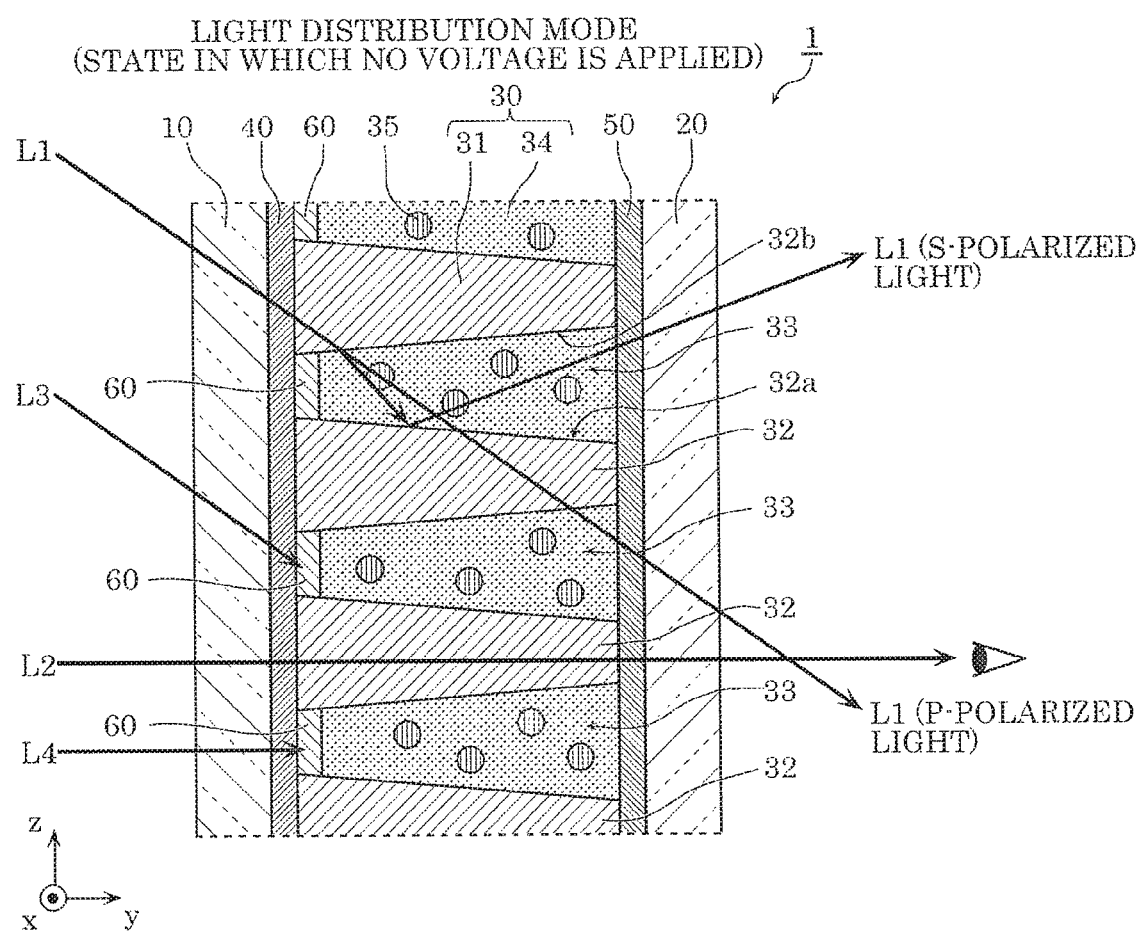
FIG. 3A is an enlarged sectional view illustrating a light distribution mode of the optical device according to Embodiment 1.
Figure 3B:
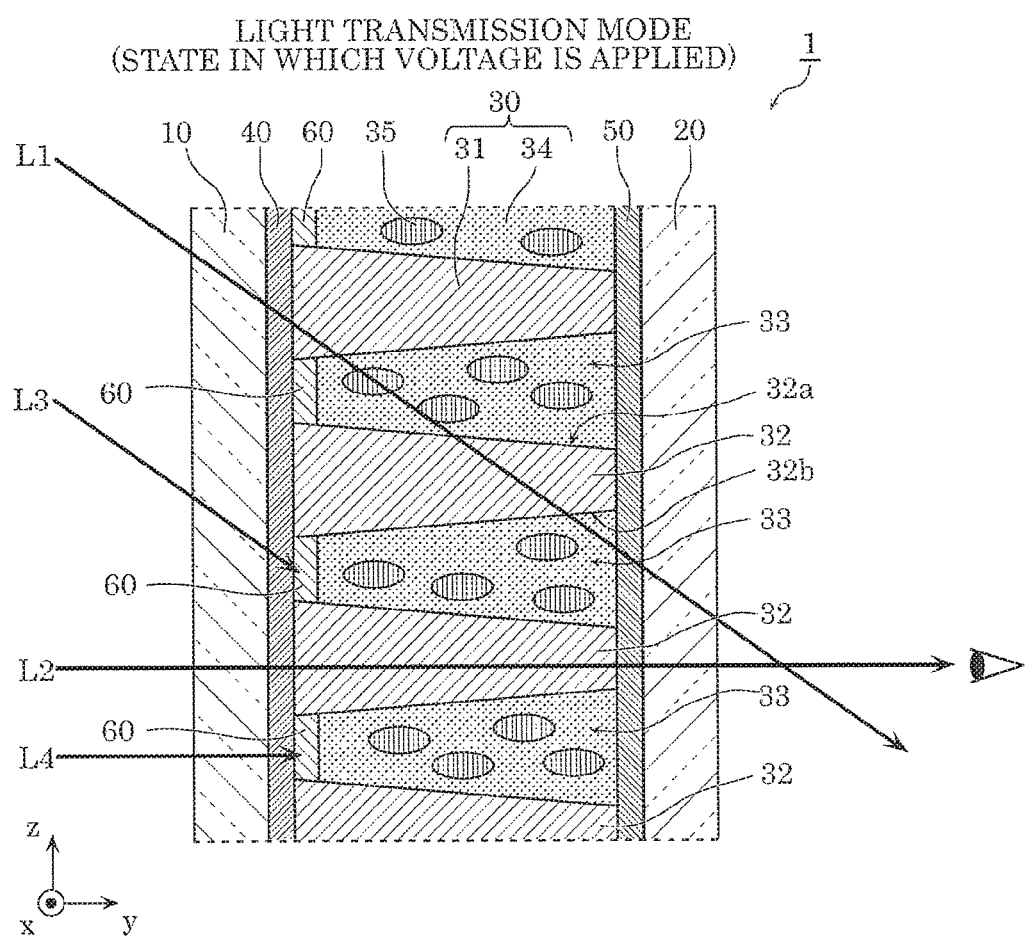
FIG. 3B is an enlarged sectional view illustrating a light transmission mode of the optical device according to Embodiment 1.

FIG. 3A is an enlarged sectional view illustrating the light distribution mode of optical device 1 according to the present embodiment. FIG. 3B is an enlarged sectional view illustrating the light transmission mode of optical device 1 according to the present embodiment.

In optical device 1, the orientation of liquid crystal molecules 35 contained in optical medium portion 34 changes depending on the electric field applied to light distribution layer 30, and specifically the voltage applied between first electrode 40 and second electrode 50. Liquid crystal molecules 35 are rod-like liquid crystal molecules having birefringence and thus have a refractive index that varies depending on the polarization state of incident light.

Light entering optical device 1, such as sunlight, includes P-polarized light (P-polarization component) and S-polarized light (S-polarization component). In both of these modes in FIGS. 3A and 3B, the direction of vibration of the P-polarized light is approximately parallel to the minor axis of liquid crystal molecules 35. Thus, the refractive index of liquid crystal molecules 35 for the P-polarized light does not depend on the mode, i.e., it is an ordinary refractive index (no) and is specifically 1.5. Therefore, the refractive index for the P-polarized light is approximately constant within light distribution layer 30, and accordingly the P-polarized light travels in a straight line within light distribution layer 30.

The refractive index of liquid crystal molecules 35 for the S-polarized light varies depending on the modes in FIGS. 3A and 3B. Hereinafter, the details of each mode will be described. Note that, unless otherwise specified, the following description in the specification of the present invention focuses on the S-polarized light out of the light entering optical device 1.

In the case where optical device 1 is in the light distribution mode as illustrated in FIG. 3A, a difference in refractive index occurs between projections 32 and optical medium portion 34 (recesses 33). In the present embodiment, projections 32 have a refractive index of 1.5, and optical medium portion 34 has a refractive index of 1.7.

Light Obliquely Entering Optical Device

Out of light such as sunlight that obliquely enters optical device 1, light L1 that does not enter light blocking component 60 is refracted at side face 32b when entering optical medium portion 34 from projection 32, then reflected off side face 32a when entering projection 32 from optical medium portion 34, and travels obliquely upward as illustrated in FIG. 3A. Note that the P-polarized light passes directly through optical device 1 and travels obliquely downward without being refracted at side face 32b and without being reflected off side face 32a.

On the other hand, in the case where optical device 1 is in the light transmission mode as illustrated in FIG. 3B, light L1 (both of the P-polarized light and the S-polarized light) passes directly through optical device 1 and travels obliquely downward because there is no difference in refractive index within light distribution layer 30.

Light Entering Approximately Perpendicular to Optical Device

Out of light that enters approximately perpendicular to optical device 1, light L2 that does not enter light blocking component 60 passes directly through projection 32 as illustrated in FIGS. 3A and 3B. In both of the light distribution mode and the light transmission mode, light L2 passes in a straight line through optical device 1.

In the case of the light distribution mode, out of light L2 that does not enter light blocking component 60, light (S-polarized light, not shown) that passes through either side face 32a or 32b is refracted at side face 32a or 32b. At this time, the light enters side face 32a or 32b at a shallow depth (i.e., at a great incident angle), so that these rays of light are refracted at side face 32a or 32b and then emitted directly from second substrate 20 (without being reflected off other side faces). Note that the P-polarized light passes directly through optical device 1.

Function of Light Blocking Component

Next, the function of Light blocking component 60 of optical device 1 will be described, including how the present embodiment has been achieved.

Figure 4:
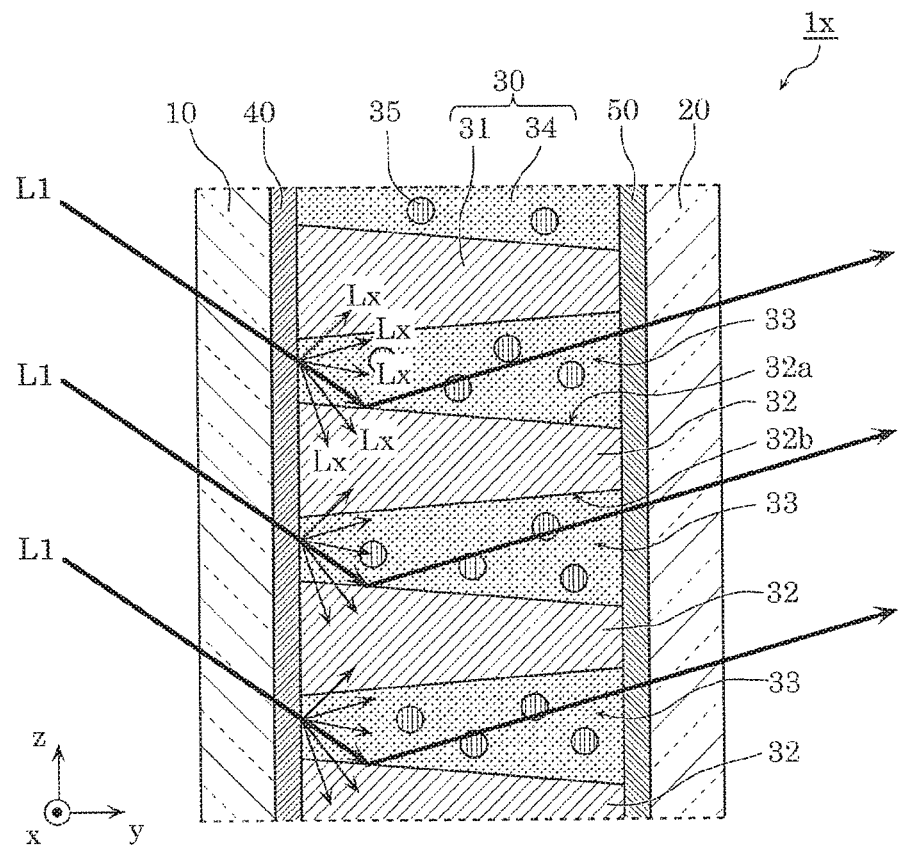
FIG. 4 is an enlarged sectional view illustrating a factor responsible for stripes of light occurring in a conventional optical device.

FIG. 4 is an enlarged sectional view illustrating a factor of stripes of light occurring in conventional optical device 1x. Optical device 1x illustrated in FIG. 4 differs from optical device 1 of Embodiment 1 illustrated in FIG. 2 in that there is no light blocking component 60. Note that FIG. 4 illustrates the case where optical device 1x is in the light distribution mode. Specifically, the refractive index of optical medium portion 34 of light distribution layer 30 is higher than the refractive index of projections 32.

At this time, light L1 that enters optical medium portion 34 (recesses 33) from first electrode 40 is partly scattered (scattered light Lx illustrated in FIG. 4) due to a difference in refractive index between first electrode 40 and optical medium portion 34. Most of the scattered light appears as strips of light along the z axial direction because the light travels within the yz plane. This causes a person who views optical device 1 from the front to feel dazzled by local glare in the form of lines.

In contrast, optical device 1 according to the present embodiment is provided with light, blocking component 60 in recesses 33 of uneven structure portion 31 as illustrated in FIGS. 1 to 3B.

As illustrated in FIGS. 3A and 3B, out of the light that obliquely enters optical device 1, light L3 that enters light blocking component 60 is blocked by light blocking component 60. This suppresses the occurrence of scattered light Lx as illustrated in FIG. 4. The intensity of each beam of scattered light Lx is weaker than the intensity of the main components of light L1, so that the scattered light is sufficiently attenuated by light blocking component 60. Out of the light that enters approximately perpendicular to optical device 1, light L4 that enters light blocking component 60 is also blocked in the same manner by light blocking component 60. In both of the light distribution mode and the light transmission mode, light L3 and light L4 are blocked by light blocking component 60.

In the present embodiment, the width (in z axial direction) of light blocking component 60 is smaller than the thickness of the roots of projections 32. Thus, the amounts of light L3 and light L4 blocked by light blocking component 60 are smaller than the amounts of light L1 and light L2 passing through projections 32. Accordingly, optical device 1 can transmit most (e.g., 80% or more) of the light entering optical device 1.

Note that light blocking component 60 may transmit part of light L3 and light L4 as described above. In this case, the transmitted light of light L3 is reflected off side faces 32a of projections 32 and emitted obliquely upward from second substrate 20 in the same manner as light L1. Also, the transmitted light of light L4 directly passes in a straight line through optical device 1 in the same manner as light L2.

Example of Use

Figure 5:
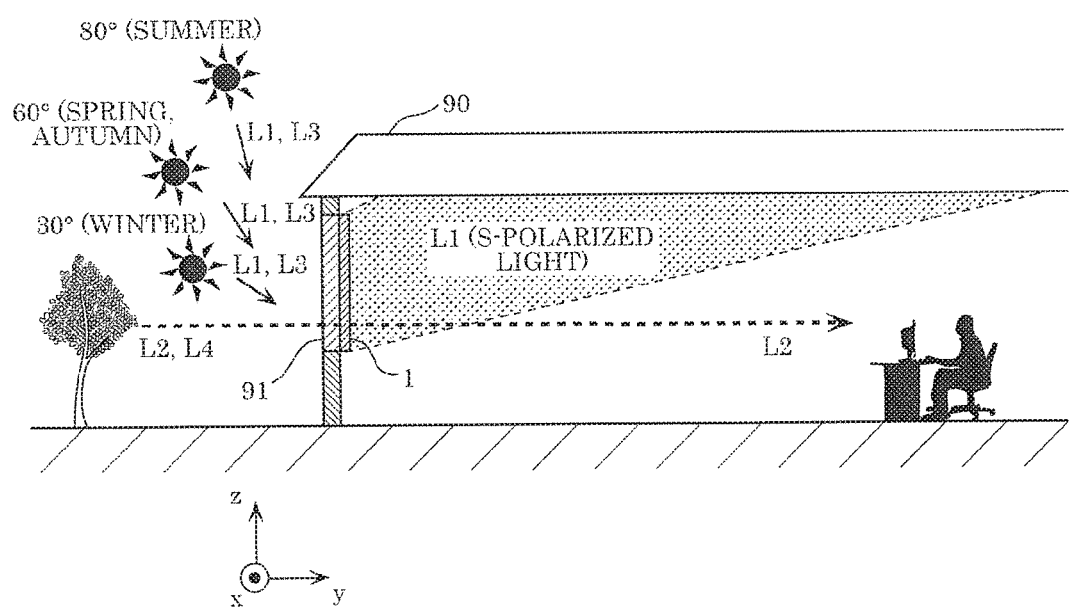
FIG. 5 illustrates an example of use in which the optical device (in a light distribution mode) according to Embodiment 1 is installed in a window.

Here, an example of use of optical device 1 according to the present embodiment will be described with reference to FIG. 5. FIG. 5 illustrates an example of use when optical device 1 (in the light distribution mode) according to the present embodiment is installed in a window.

As illustrated in FIG. 5, optical device 1 can e implemented as a window having a light distribution unction by being installed in window 91 of architectural structure 90. Optical device 1 is, for example, bonded to existing window 91 with an adhesive layer. In this case, optical device 1 is installed in window 91 in such a posture that the main faces of first substrate 10 and second substrate 20 are parallel to the vertical direction (z axial direction).

Although a detailed structure of optical device 1 is not shown in FIG. 5, optical device 1 is disposed such that first substrate 10 is positioned on the outdoor side and second substrate 20 is positioned on the indoor side, and that side faces 32a of projections 32 are on the ceiling side and side faces 32b thereof are on the floor side. That is, optical device 1 is disposed such that first substrate 10 is positioned on the light incidence side, and second substrate 20 is positioned on the light emission side.

In the case where optical device 1 is in the light distribution mode, light L1 (S-polarized light) is reflected off side faces 32a and travel obliquely upward as illustrated in FIG. 3A, because a difference in refractive index occurs between projections 32 and optical medium portion 34. Thus, the indoor ceiling is irradiated with the light reflected off side faces 32a as illustrated in FIG. 5. In this way, the indoor area can be illuminated by taking sunlight in and irradiating the ceiling surface with the light. This, for example, allows an indoor luminaire to be turned out or to have suppressed optical output, thus achieving power savings.

At this time, out of the light reflected from a view (light entering approximately perpendicular to optical device 1), light that does not pass through side faces 32a or 32b does not change its travel direction, so that the view can be seen by that light. Also, out of light that passes through side faces 32a or 32b, the S-polarized light changes its travel direction, but the P-polarized light does not change its travel direction.

Thus, even in the light distribution mode, the transmittance of light reflected from the view is higher than or equal to 50%. Accordingly, it is possible to illuminate the indoor area while maintaining spaciousness created by the inherent transparency of the window.

Optical device 1 can further suppress the occurrence of scattered light with the presence of light blocking component 60. Accordingly, it is possible to suppress local glare that appears as stripes of light.

Optical device 1 can also control the travel direction of light L1 reflected off side faces 32a by using the refractive index of optical medium portion 34. That is, the elevation angle of light emitted from optical device 1 can be adjusted. Specifically, the elevation angle of outgoing light can be adjusted by adjusting the refractive index of optical medium portion 34. The refractive index of optical medium portion 84 can be adjusted in stages by controlling the voltage applied between first electrode 40 and second electrode 50.

For example, since the solar elevation varies from season to season or hour to hour, the incident angle of sunlight entering optical device 1 varies from season to season or hour to hour. In view of this, optical device 1 adjusts the refractive index of optical medium portion 34 so as to make, for example, appropriately constant the angle of emission (elevation angle) of light emitted from optical device 1. Thus, even if the solar elevation varies from season to season or hour to hour, a given area of the ceiling surface can always be irradiated. This enhances lighting efficiencies regardless of season or hour, thus achieving power savings.

Advantageous Effects

As described above, optical device 1 according to the present embodiment includes first substrate 10 being light transmissive, second substrate 20 facing first substrate 10 and being light transmissive, and light distribution layer 30 disposed between first substrate 10 and second substrate 20 and distributing incident light. Light distribution layer 30 includes uneven structure portion 31 having a plurality of projections 32 that are repeated in a first direction (z axial direction) parallel to the main face of first substrate 10, and optical medium portion 34 containing a birefringent material and disposed so as to fill a plurality of recesses 33 that correspond the spaces between the plurality of projections 32. Light blocking component 60 that blocks at least part of incident light is disposed in the plurality of recesses 33.

With this configuration, since light blocking component 60 is provided in recesses 33, scattered light occurring in recesses 33 can be blocked by light blocking component 60. This suppresses the appearance of stripes of light as described with reference to FIG. 4. In this way, the present embodiment can provide optical device 1 that can reduce local glare.

For example, optical device 1 further includes first electrode 40 and second electrode 50 that are disposed so as to sandwich light distribution layer 30 therebetween. The refractive index of optical medium portion 34 changes upon application of a voltage between first electrode 40 and second electrode 50.

With this configuration, the refractive index of optical medium portion 34 can be changed by applying a voltage between first electrode 40 and second electrode 50. Thus, optical device 1 can achieve a plurality of optical states in response to the applied voltage. For example, optical device 1 can achieve a light distribution mode of causing incident sunlight or the like to travel toward the indoor ceiling face, and a light transmission mode of causing incident sunlight or the like to travel directly.

For example, light blocking component 60 is disposed at the bottoms of the plurality of recesses 33.

With this configuration, for example when projections 32 have a trapezoidal or triangular shape in cross section, the width of recesses 33 can be narrowed and accordingly the area of light blocking component 60 can also be reduced. Therefore, it is possible to reduce local glare while suppressing a reduction in the amount of light passing through optical device 1.

Each of the plurality of projections 32 is, for example, a long projection extending in the x axial direction orthogonal to the z axial direction.

With this configuration in which projections 32 are long projections, it is possible to increase the length in the x axial direction of side faces 32a that function as reflecting faces and to increase the area of side faces 32a. This improves light efficiencies because more light can be reflected toward the indoor ceiling or the like.

Variation 1

Variation 1 of the present embodiment will now be described with reference to FIG. 6A.

Figure 6A:
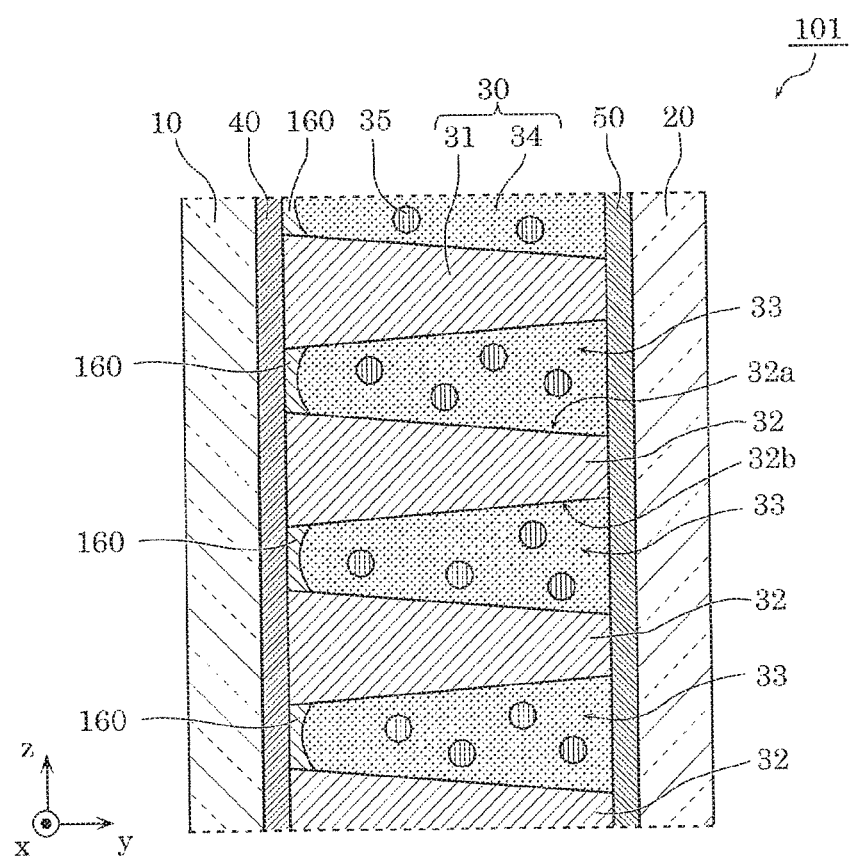
FIG. 6A is an enlarged sectional view of an optical device according to Variation 1 of Embodiment 1.

FIG. 6A is an enlarged sectional view of optical device 101 according to the present variation. As illustrated in FIG. 6A, optical device 101 according to the present variation differs from optical device 1 illustrated in FIG. 2 in that light blocking component 60 is replaced by light blocking component 160. The following description focuses mainly on differences from the present embodiment, and description of common points may be omitted or simplified.

As illustrated in FIG. 6A, light blocking component 160 differs in sectional shape from light blocking component 60. Specifically, the film thickness of light blocking component 160 at both ends in the z axial direction is greater than the film thickness thereof in the central portion in the z axial direction. For example, light blocking component 160 has a curved surface (concave surface) as a face of contact with optical medium portion 34.

Light blocking component 160 is formed by, for example, drying ink that contains a black pigment. At this time, when the ink is applied and dried with the optical device in such a posture that first substrate 10 is positioned on the vertically lower side (i.e., the positive direction of the y axis is in the vertically upward direction), a concave surface is formed naturally by the weight of the ink and surface tension.

As described above, in optical device 101 according to the present variation, the film thickness of light blocking component 60 at both ends in the z axial direction is greater than the film thickness thereof in the central portion in the z axial direction.

With this configuration, the central portion of light blocking component 160 has higher light transmittance because the thickness of the central portion is small. Accordingly, the light blocking component can transmit main incident light while blocking scattered light. This suppresses local glare and improves lighting efficiencies. This configuration also improves viewability of an outdoor view for a person in the indoor area, thus improving the inherent function (i.e., transparency) of the window.

Although the present variation takes the example of the case where light blocking component 160 with different film thicknesses is formed naturally by drying ink, the present invention is not limited to this example. The film thickness may be reduced by first forming light blocking component 60 of a uniform film thickness and then etching the central portion of light blocking component 60 by etching or other methods.

Variation 2

Next, Variation 2 of the present embodiment will be described with reference to FIG. 6B.

Figure 6B:
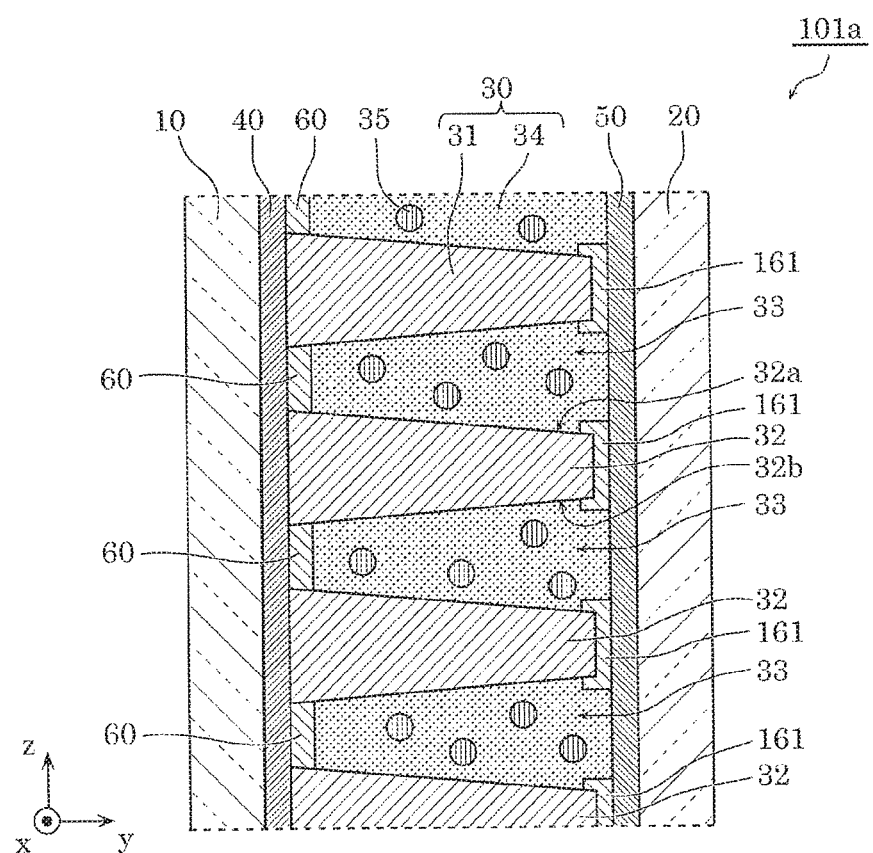
FIG. 6B is an enlarged sectional view of an optical device according to Variation 2 of Embodiment 1.

FIG. 6B is an enlarged sectional view of optical device 101a according to the present variation. As illustrated in FIG. 6B, optical device 101a according to the present variation differs from optical device 101 illustrated in FIG. 2 in that another light blocking component 161 is provided. The following description focuses mainly on differences from the present embodiment, and description of common points may be omitted or simplified.

Light blocking component 161 blocks at least part of incident light in the same manner as light blocking component 60. For example, light blocking component 161 contains a black pigment and is made of a material similar to that for light blocking component 60.

Light blocking component 161 is provided so as to cover projections 32. Specifically, light blocking component 161 is provided so as to cover not only end faces at the tips of projections 32 (on the side of second substrate 20) but also part of side faces 32a and 32b at the tips of projections 32. For example, light blocking component 161 is formed by applying a water-based black ink to the tips of projections 32 and then drying the applied ink. Light blocking component 161 may have a uniform film thickness, or may have a thickness that decreases from both ends to the central portion.

Thus, optical device 101a including light blocking component 161 can suppress light scattered from projections 32.

Embodiment 2

Next, Embodiment 2 will be described.
Configuration

Figure 7:
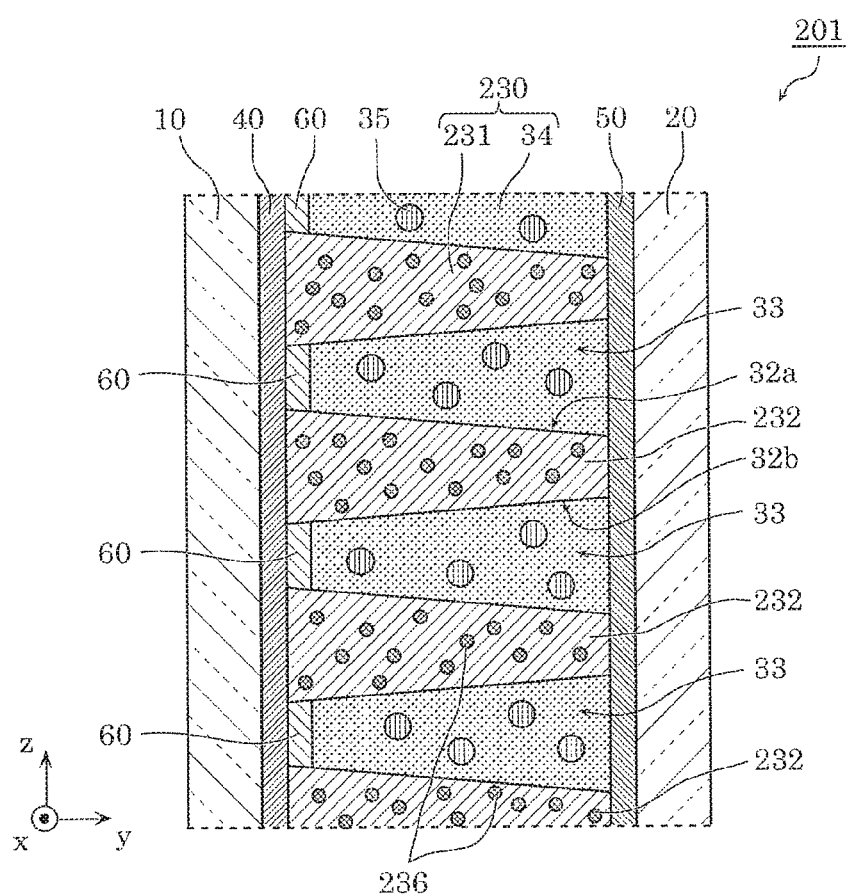
FIG. 7 is an enlarged sectional view of an optical device according to Embodiment 2.

FIG. 7 is an enlarged sectional view of optical device 201 according to the present embodiment. As illustrated in FIG. 7, optical device 201 according to the present embodiment differs from optical device 1 illustrated in FIG. 2 in that light distribution layer 30 is replaced by light distribution layer 230. The following description focuses mainly on differences from Embodiment 1, and description of common points may be omitted or simplified.

As illustrated in FIG. 7, light distribution layer 230 includes uneven structure portion 231 (uneven layer) and optical medium portion 34 (optical medium layer). Uneven structure portion 231 has a plurality of projections 232 and a plurality of recesses 33.

A plurality of light absorbers 236 that absorb incident light is dispersed in at least some of the plurality of projections 232. Although a plurality of light absorbers 236 is dispersed in all of the plurality of projections 232 in the present embodiment, uneven structure portion 231 may have projections in which light absorbers 236 are not dispersed (i.e., projections 32 according to Embodiment 1). For example, a plurality of light absorbers 236 may be dispersed at intervals of n projections 232 in the z axial direction (where n is a natural number greater than or equal to 1). For example, uneven structure portion 231 may be configured by alternately arranging projections 232 in which a plurality of light absorbers 236 is dispersed and projections 32 in which a plurality of light absorbers 236 is not dispersed.

Light absorbers 236 are, for example, made of a coloring material such as a particulate black pigment, but is not limited to this. Light absorbers 236 are, for example, made of an isotropic pigment, but may be made of an an isotropic pigment. Specifically, light absorbers 236 may be configured to absorb S-polarized light and not to absorb P-polarized light.

Function of Light Absorbers

Next, the function of light absorbers 236 in optical device 201 will be described, including how the present embodiment has been achieved.

Figure 8:
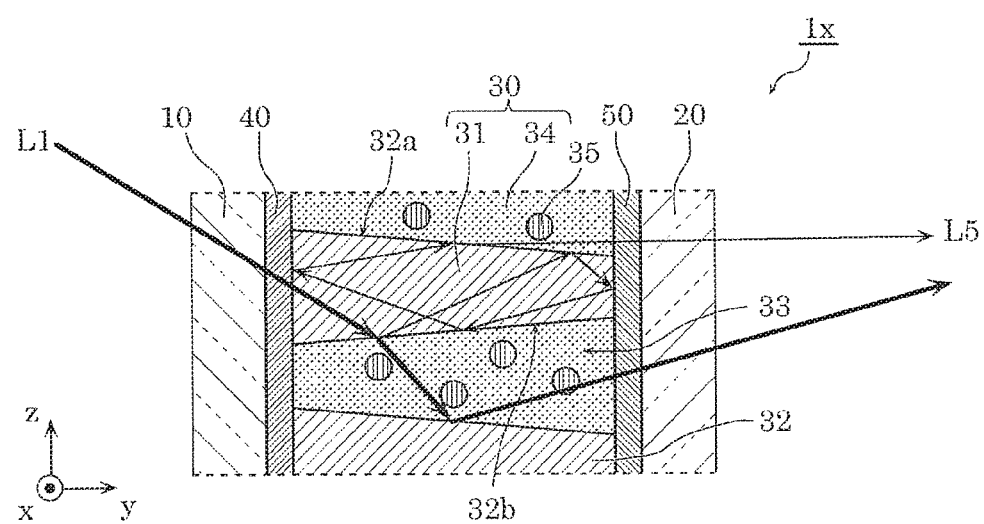
FIG. 8 is an enlarged sectional view illustrating a factor responsible for stripes of light occurring in a conventional optical device.

FIG. 8 is an enlarged sectional view illustrating a factor of stripes of light occurring in conventional optical device 1x. As illustrated in FIG. 8, most of light L1 entering optical device 1x is refracted at side face 32b of projection 32, but part of the light is reflected off side face 32b (Fresnel reflection). The light reflected off side face 32b is repeatedly reflected inside projection 32 and is then emitted as light L5 from second substrate 20. Specifically, light L5 is emitted after having been reflected a plurality of times at, for example, side faces 32a and 32b and at the interfaces between projection 32 and first and second electrodes 40 and 50 inside projection 32. This emitted light L5 constitutes a factor of stripes of light.

In contrast, in optical device 201 according to the present embodiment, a plurality of light absorbers 236 are dispersed in projections 232.

Figure 9:
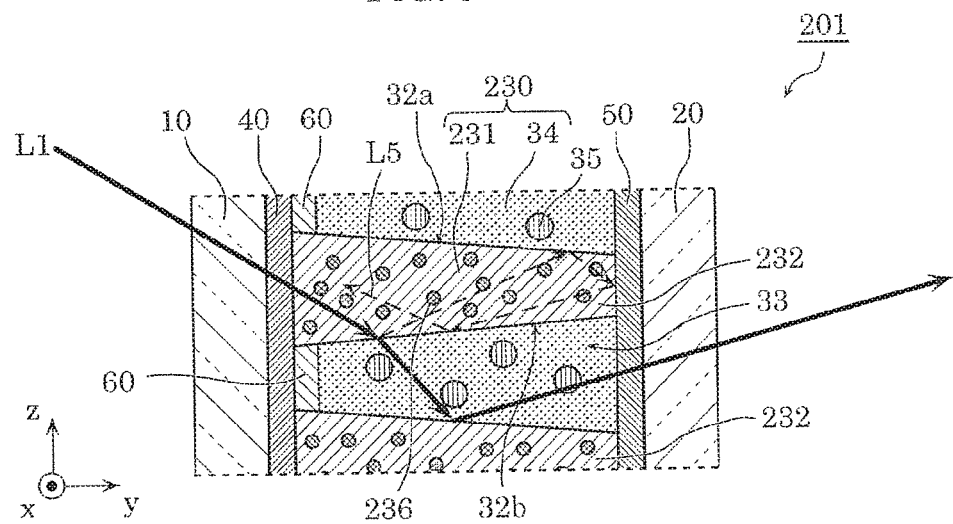
FIG. 9 is an enlarged sectional view illustrating the light distribution mode of the optical device according to Embodiment 2.

Thus, light L5 reflected inside projection 232 is absorbed by the plurality of light absorbers 236 as illustrated in FIG. 9. Note that FIG. 9 is an enlarged sectional view illustrating the light distribution mode of optical device 201 according to the present embodiment.

As illustrated in FIG. 9, principal components of light L1 pass through projection 232 only once and have a short passing distance. Thus, only a slight amount of the light is absorbed (attenuated) by light absorbers 236. In contrast, light L5 reflected inside projection 232 has a long passing distance inside projection 232 because it is reflected a plurality of times. Accordingly, light absorbers 236 can effectively absorb reflected light L5 while suppressing a reduction in the amount of principal components of light L1.

Note that the light reflected off side faces 32b is S-polarized Thus, if light absorbers 236 are made of an anisotropic pigment that absorbs S-polarized light but does not absorb P-polarized light, the absorption of P-polarized light can be suppressed. This allows P-polarized light to directly pass through without being absorbed, thus increasing the transmittance of optical device 1.

Advantageous Effects

As described above, in optical device 201 according to the present embodiment, a plurality of light absorbers 236 that absorb incident light is dispersed in, for example, at least some of the plurality of projections 232.

This configuration enables efficient absorption of reflected light reflected inside projections 232. Accordingly, it is possible to suppress the occurrence of stripes of light due to reflected light L5 and to reduce local glare.

Embodiment 3

Next, Embodiment 3 will be described.

In Embodiments 1 and 2 described above, scattered light caused at the interface between first electrode 40 and light distribution layer 30 and scattered light caused by Fresnel reflection inside projections 32 are given as a factor of local glare, but the cause is not limited to this.

Figure 10:
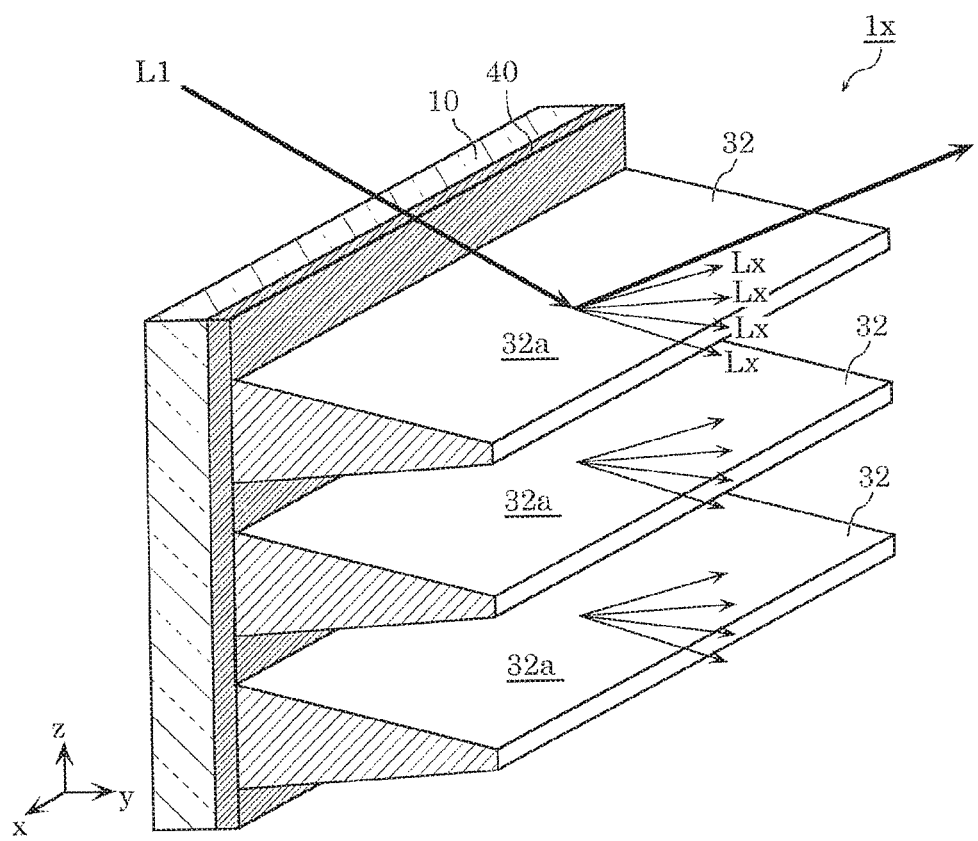
FIG. 10 is a perspective view illustrating a factor responsible for stripes of light occurring in a conventional optical device.
Figure 11:
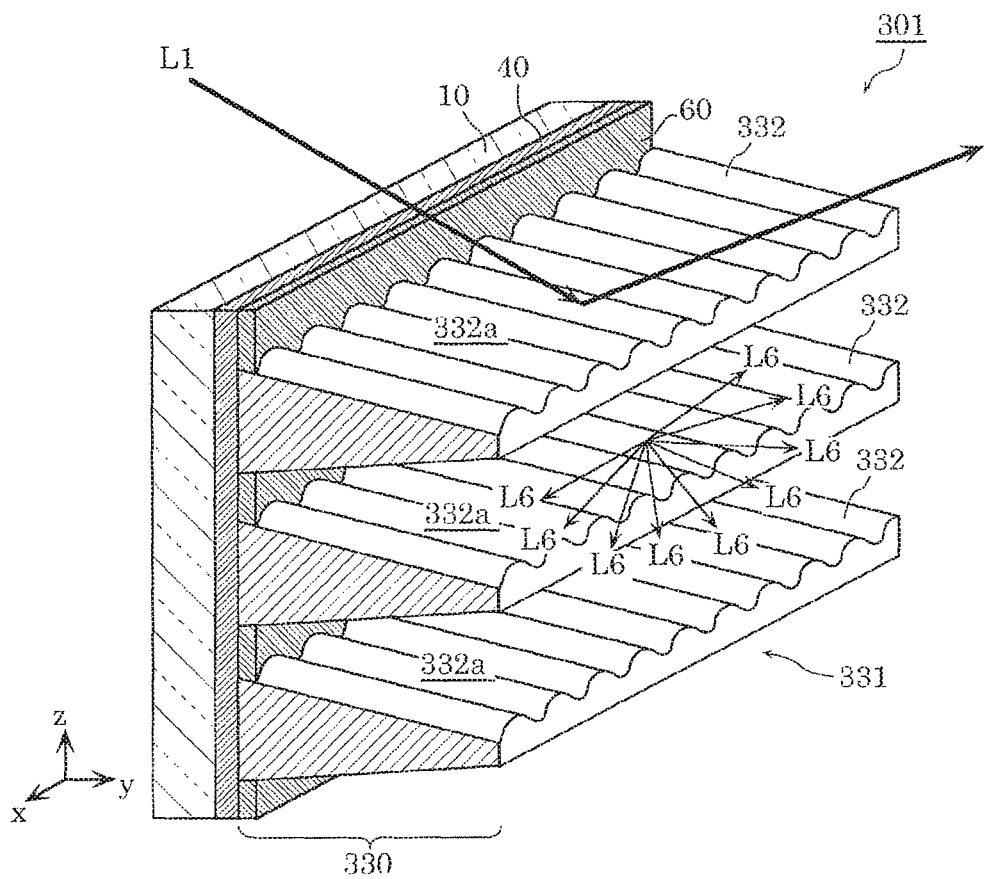
FIG. 11 is a perspective view illustrating part of an optical device according to Embodiment 3.

FIG. 10 is a perspective view illustrating a factor of stripes of light occurring in conventional optical device 1x. FIG. 11 is a diagram in which a portion equivalent to region II surrounded by the dashed dotted line in FIG. 1 is viewed obliquely. Optical medium portion 34, second electrode 50, and second substrate 20 are not shown in order to clearly show the shape of the uneven structure portion. These also apply to FIGS. 11, 14, and 15, which will be described later.

As illustrated in FIG. 10, part of light L1 is scattered when reflected off side face 32a of projection 32. The intensity of this scattered light (Lx) is high in the yz plane so that the scattered light appears as a stripe of light extending in the longitudinal direction (z axial direction).

Configuration

FIG. 11 is a perspective view illustrating part of optical device 301 according to the present embodiment. As illustrated in FIG. 11, optical device 301 according to the present embodiment differs from optical device 1 illustrated in FIG. 1 in that light distribution layer 30 is replaced by light distribution layer 330. The following description focuses mainly on differences from Embodiment 1, and description of common points may be omitted or simplified.

As illustrated in FIG. 11, light distribution layer 330 includes uneven structure portion 331. Although not shown in FIG. 11, light distribution layer 330 also includes optical medium portion 34. Optical medium portion 34 is disposed so as to fill the spaces (i.e., recesses 33) between projections 332 of uneven structure portion 331 as in Embodiment 1 and other embodiments.

Uneven structure portion 331 has a plurality of projections 332. Side face 332a of each of the plurality of projections 332 is a scattering surface that scatters incident light. FIG. 11 illustrates scattered light L6 that scatters in various directions. Side faces 332a serving as scattering surfaces have anisotropic scattering properties. Specifically, side faces 332a have strong scattering properties in directions orthogonal to the yz plane and have weak scattering properties in directions parallel to the yz plane.

Figure 12:
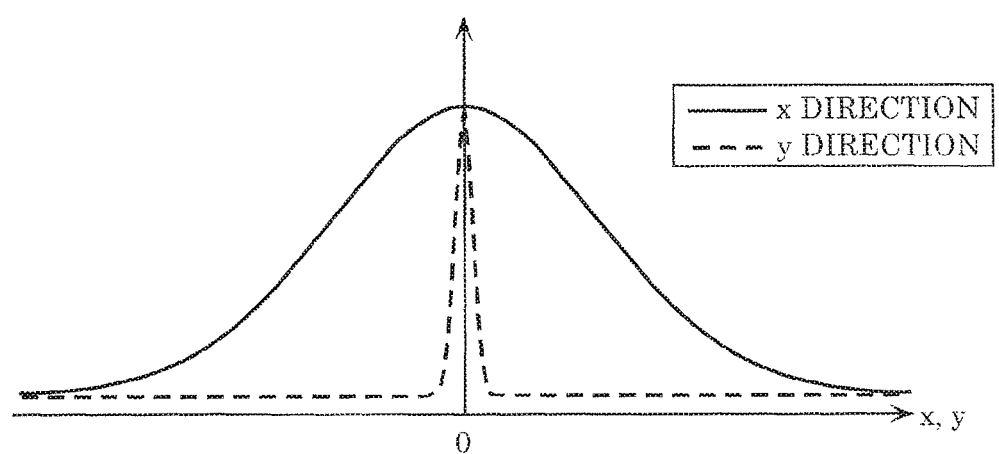
FIG. 12 illustrates scattering properties of a scattering surface of the optical device according to Embodiment 3.

FIG. 12 illustrates the scattering properties of side faces 332a of optical device 301 according to the present embodiment. FIG. 12 illustrates a scattering distribution of side faces 332a in the x axial direction and a scattering distribution thereof in the y axial direction, which are in the form of Gaussian distribution. The scattering distributions are distributions that indicate light intensity at a distance from the point of incidence of light FIG. 12, the horizontal axis indicates the distance in the x or y axial direction, and the vertical axis indicates the light intensity. The center of the horizontal axis ("0") is the point of incidence of light L1.

As indicated by the solid line in FIG. 12, side faces 332a according to the present embodiment have high scattering properties in the x axial direction. Specifically, standard deviation σx of the scattering distribution in the x direction is greater than standard deviation σy of the scattering distribution in the y axial direction. For example, σx is greater than 10 degrees and σy is less than one degree.

Specifically, side faces 332a are curved faces that change periodically in the x axial direction as illustrated in FIG. 11. That is, side faces 332a have undulations the x axial direction. For example, side faces 332a are undulated surfaces on which asperities of a predetermined shape are repeated periodically in the x axial direction. Side faces 332a make almost no change in the y axial direction. That is, the shape of side faces 332a in xz cross section is approximately the same at any point in the y axial direction. For example, side faces 332a have a sinusoidal shape or a shape of repeated circular arcs in xz cross section.

Here, side faces 332a do not necessarily have to be curved surfaces. Specifically, the asperities of side faces 332a may be configured by a combination of a plurality of flat surfaces. For example, side faces 332a may have a triangular or rectangular wave shape in xz cross section.

For example, undulations (asperities) of side faces 332a are formed at the same time when projections 332 are formed. Specifically, the undulations are formed by mold embossing or imprinting using a mold with recesses having an inverted shape of the undulations of side faces 332a. Alternatively, side faces 32a serving as scattering surfaces may be formed by first forming projections 32 having side faces 32a that are not scattering surfaces and then processing side faces 32a. Etching or other methods can be used to process side faces 32a.

Alternatively, side faces 332a may have isotropic scattering properties. For example, side faces 332a may be surfaces with fine asperities that are formed randomly. For example, side faces 332a may have dot-like asperities that are formed randomly. The surfaces with fine asperities can be formed by, for example, surface texturing, aching, or chemical solution processing.

Note that although the present embodiment describes an example in which side faces 332a on the upper side of projections 332 serve as scattering surfaces, side faces 32b on the lower side of projections 332 may serve as scattering surfaces. Also, both of side faces 332a and 32b may serve as scattering surfaces. That is, at least either of side faces 332a and 32b of each of the plurality of projections 332, the side faces intersecting with the z axial direction, serves as a scattering surface.

Advantageous Effects

As described above, in optical device 301 according to the present embodiment, for example at least one of side faces 332a and 32b of each of the plurality of projections 332, the side faces intersecting with the z axial direction, serves as a scattering surface that scatters incident light.

This configuration can suppress scattered light in the yz plane and accordingly suppress the appearance of stripes of light along the z axial direction. Accordingly, it is possible to suppress local glare of light.

Also, the scattering surfaces have, for example, anisotropic scattering properties.

In this case, for example, the appearance of stripes of light can be strongly suppressed by scattering light actively in the x axial direction. This further suppresses local glare of light.

Variation

Here, a variation of the present embodiment will be described with reference to FIGS. 13 and 14.

Figure 13:
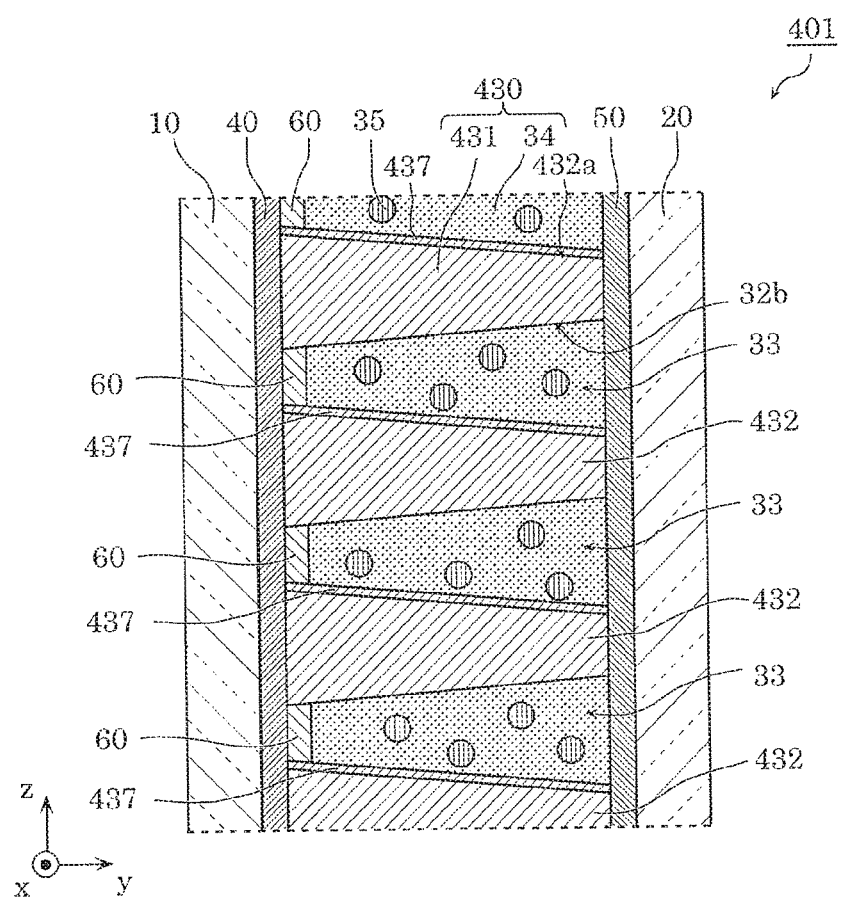
FIG. 13 is an enlarged sectional view of an optical device according to a variation of Embodiment 3.
Figure 14:
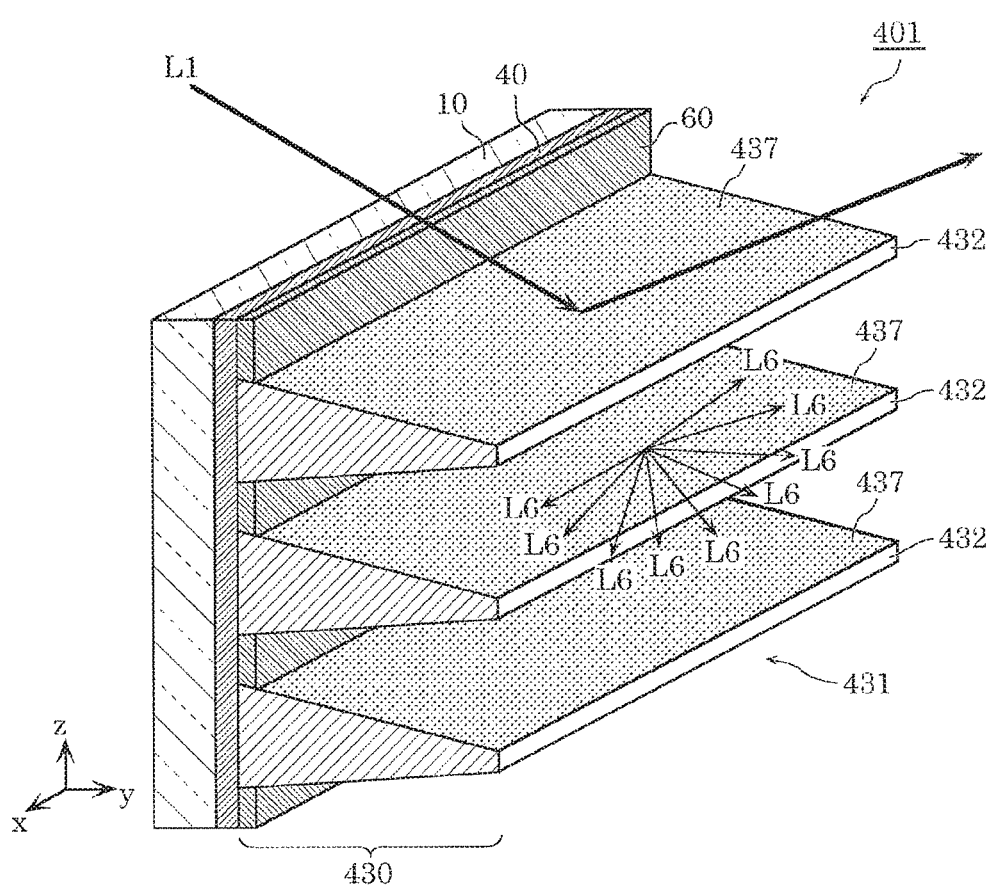
FIG. 14 is a perspective view illustrating part of the optical device according to the variation of Embodiment 3.

FIG. 13 is an enlarged sectional view of optical device 401 according to the present variation. FIG. 14 is a perspective view illustrating part of optical device 401 according to the present variation.

Optical device 401 differs from optical device 201 illustrated in FIG. 11 in that light distribution layer 330 is replaced by light distribution layer 430. Specifically, light distribution layer 430 includes uneven structure portion 431 and optical medium portion 34. The following description focuses mainly on differences from the present embodiment, and description of common points may be omitted or simplified.

Uneven structure portion 431 has a plurality of projections 432 and a plurality of recesses 33. Thin metal film 437 is formed on side faces 432a of the plurality of projections 432. Side faces 432a are scattering surfaces and have, for example, fine asperities formed thereon. Like side faces 332a illustrated in, for example, FIG. 11, side faces 432a may have undulations.

Thin metal film 437 is, for example, a thin film made of metal such as aluminum or silver. Thin metal film 437 can be formed on side faces 432a by a method such as evaporation, plating, or sputtering.

Thin metal film 437 is formed, for example, along fine asperities or undulations so as to maintain the scattering properties of side faces 432a. Specifically, thin metal film 437 has, for example, fine asperities or undulations on its surface so that the surface of thin metal film 437 has scattering properties.

In this way, thin metal film 437 is formed on the scattering surfaces in optical device 401 according to the present variation.

The use of thin metal film 437 improves reflectivity. Also, thin metal film 437 reflects not only S-polarized light but also P-polarized light. Thus, when optical device 401 is used in window 91, irradiation of the floor by the window can be suppressed.

Note that thin metal film 437 may be made of half-mirror metal. That is, thin metal film 437 may have not only reflectivity but also light transmission properties. In this case, thin metal film 437 reflects part of incident light and transmits part of incident light. This configuration suppresses a reduction in light transmittance and enough ensures, for example, the function of offering viewability of an outdoor view as a so-called window.

Embodiment 4

Next, Embodiment 4 will be described.
Configuration

Figure 15:
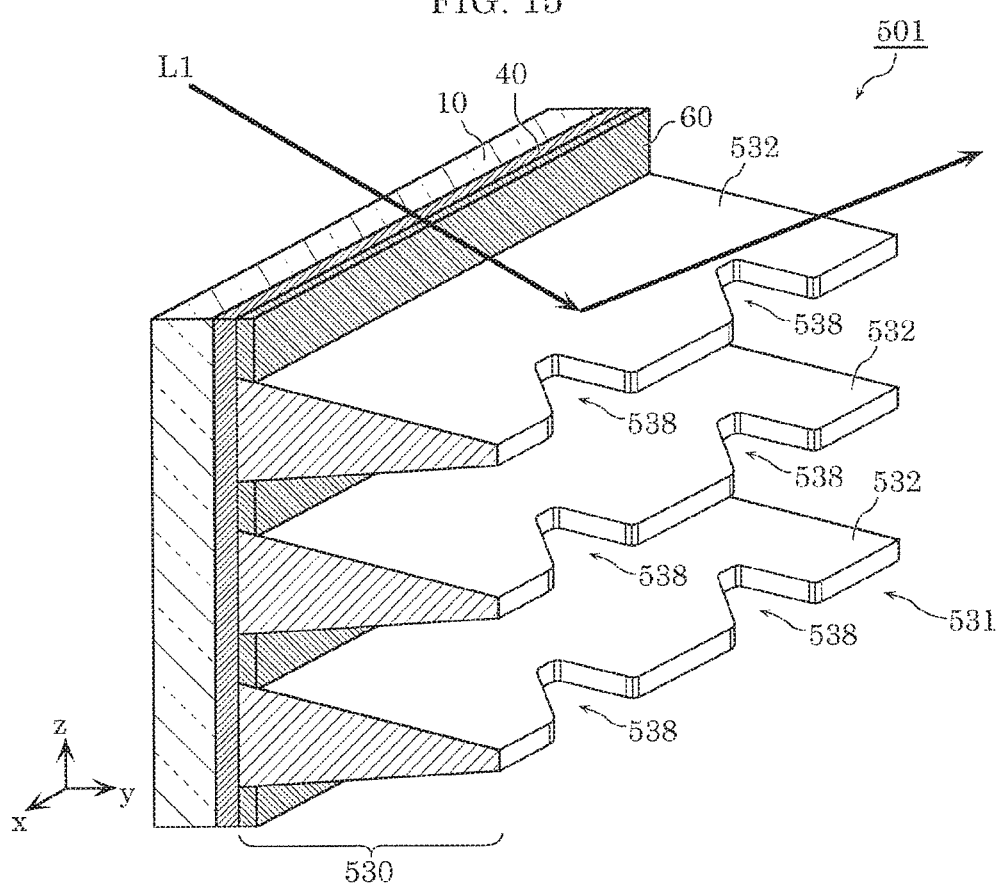
FIG. 15 is a perspective view illustrating part of an optical device according to Embodiment 4.

FIG. 15 is a perspective view illustrating part of optical device 501 according to the present embodiment. As illustrated in FIG. 15, optical device 501 according to the present embodiment differs from optical device 1 illustrated in FIG. 2 in that light distribution layer 30 is replaced by light distribution layer 530. The following description focuses mainly on differences from Embodiment 1, and description of common points may be omitted or simplified.

As illustrated in FIG. 15, light distribution layer 530 includes uneven structure portion 531 and optical medium portion 34 (not shown). Uneven structure portion 531 has a plurality of projections 532 and a plurality of recesses 33 (not shown).

The tops of the plurality of projections 532 have bumps and dips (mountains and valleys) that are repeated in the axial direction. The tops of projections 532 are the ends of projections 532 on the side of second substrate 20. Specifically, as illustrated in FIG. 15, the tops of projections 532 have recesses 538 of a predetermined shape that are repeatedly formed at predetermined intervals in the x axial direction.

Figure 16A:
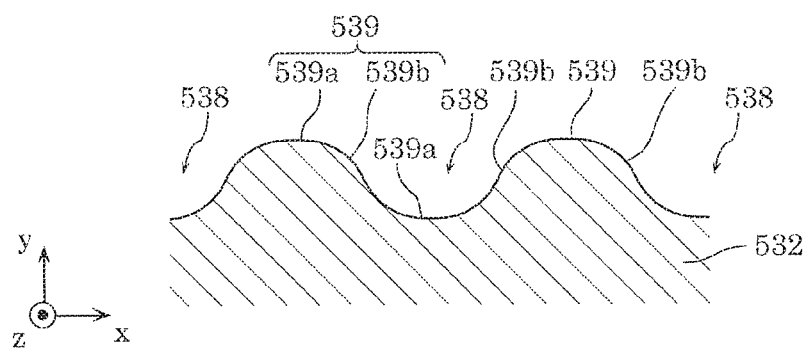
FIG. 16A is a plan view illustrating the shape, when viewed from above, of bumps and dips formed in a projection of the optical device according to Embodiment 4.

FIG. 16A is a plan view illustrating the shape, when viewed from above, of the bumps and dips formed in projection 532 of optical device 501 according to the present embodiment. The mountain- and valley-like solid line (wavy line) in FIG. 16A corresponds to the contour line of the top of projection 532 when viewed from above, and indicates end face 539 of the top.

End face 539 includes flat portions 539a and curved portions 539b. In the present embodiment, flat portions 539a serving as mountains are in contact with second electrode 50. Flat portions 539a serving as valleys correspond to the bottoms of recesses 538. Curved portions 539b has, for example, a sinusoidal shape or a shape of repeated circular arcs.

Figure 16B:
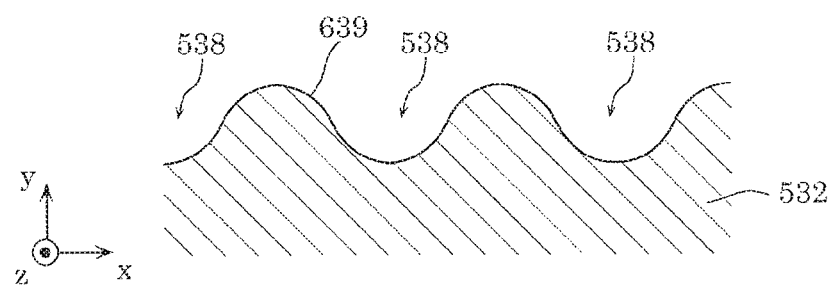
FIG. 16B is a plan view showing another example of the shape, when viewed from above, of bumps and dips formed in a projection of the optical device according to Embodiment 4.

Note that the shape, when viewed from above, of the bumps and dips formed in projection 532 is not limited to the example illustrated in FIG. 16A. FIG. 16B is a plan view showing another example of the shape, when viewed from above, of bumps and dips formed in projection 532 of optical device 501 according to the present embodiment.

End face 639 illustrated in FIG. 16B is another example of the end face of the top of projection 532 and does not include flat portions. That is, end face 639 forms a curved portion in its entirety when viewed from above. End face 639 has, for example, a sinusoidal shape or a shape of repeated circular arcs in plan view.

Note that the asperities (undulations) on side faces 332a described in Embodiment 3 may have the same shape as the shape of end faces 539 and 639 illustrated in FIGS. 16A and 16B.

Advantageous Effects

As described above, for example, bumps and dips that are repeated in the x axial direction are provided at the tops of the plurality of projections 532 in optical device 501 according to the present embodiment.

The presence of these bumps and dips repeated in the x axial direction allows light to be scattered actively in the x axial direction. Accordingly, it is possible to further suppress local glare of light.

Embodiment 5

Next, Embodiment 5 will be described.
Configuration

Figure 17:
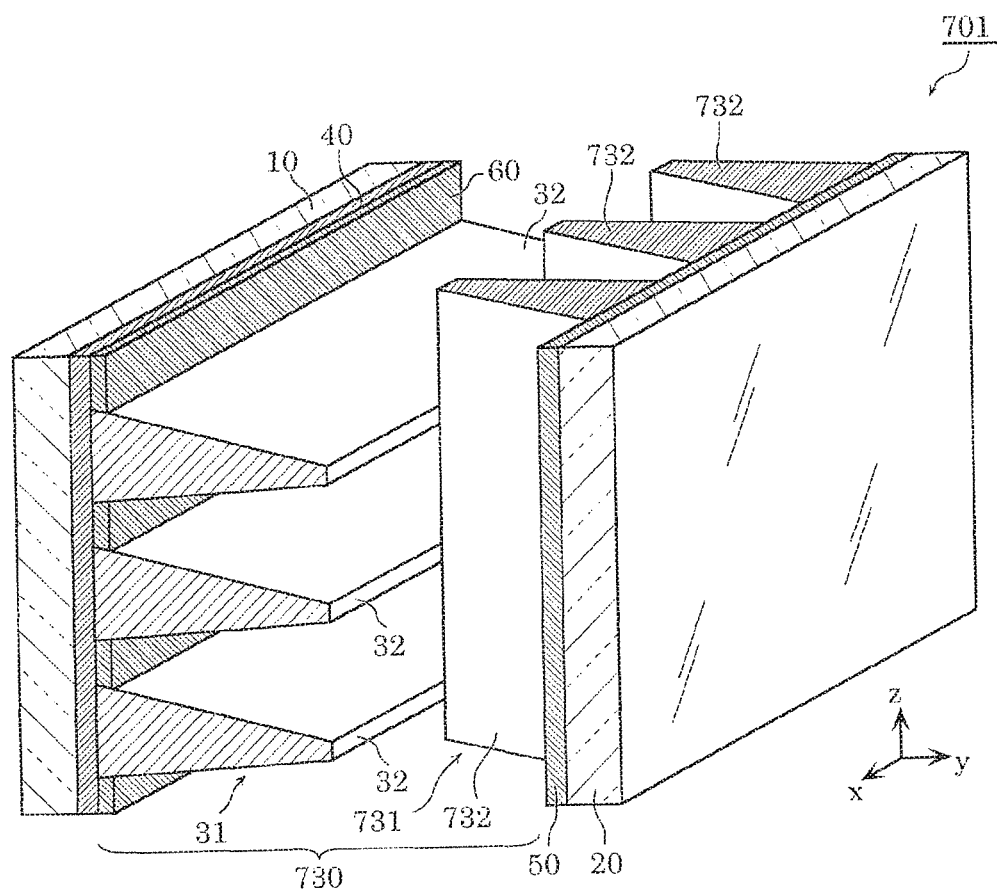
FIG. 17 is a perspective view illustrating part of an optical device according to Embodiment 5.

FIG. 17 is a perspective view illustrating part of optical device 701 according to the present embodiment. Note that FIG. 17 is a diagram in which a portion equivalent to region II surrounded by the dashed dotted line in FIG. 1 is viewed obliquely. Optical medium portion 34 is not shown in order to clearly show the shape of the uneven structure portion.

As illustrated in FIG. 17, optical device 701 according to the present embodiment differs from optical device 1 illustrated in FIG. 2 in that light distribution layer 30 is replaced by light distribution layer 730. The following description focuses mainly on differences from Embodiment 1, and description of common points may be omitted or simplified.

As illustrated in FIG. 17, light distribution layer 730 further includes another uneven structure portion 731. Uneven structure portion 731 is one example of a second uneven structure portion having a plurality of projections 732. Specifically, uneven structure portion 731 is an uneven structure configured by a plurality of micro- or nano-order size projections 732. Recesses are formed between the plurality of projections 732.

The plurality of projections 732 is one example of a plurality of second projections that are repeated in the x axial direction (second direction). The plurality of projections 732 is formed in a stripe shape. Each of the plurality of projections 732 is a long projection that extends in the z axial direction (first direction). Each of the plurality of projections 732 has, for example, the same shape as the shape of projections 32.

Uneven structure portion 731 and uneven structure portion 31 are disposed such that their strips extend in directions perpendicular to each other. Like uneven structure portion 31, uneven structure portion 731 can refract or reflect light by using a difference in refractive index between itself and optical medium portion 34 filled in the recesses. Uneven structure portion 731 scatters light (Lx illustrated in FIG. 10) in the x axial direction, the light having been scattered in the yz plane by uneven structure portion 31.

Advantageous Effects

As described above, in optical device 701 according to the present embodiment, for example, light distribution layer 730 further includes uneven structure portion 731 having a plurality of projections 732 that are repeated in the x axial direction, and each of the plurality of projections 732 is a long projection extending in the z axial direction.

With this configuration, light can be scattered actively in the x axial direction by the plurality of projections 732 that are repeated in the x axial direction. Accordingly, it is possible to further suppress local glare of light.

Other Embodiments and Variations

Although embodiments and variations of the optical device according to the present invention have been described thus far, the present invention is not intended to be limited to the embodiments and variations described above.

For example, while Embodiment 1 described above describes an example in which light blocking component 60 may transmit part of light, light blocking component 60 may completely block light. At this time, light blocking component 60 may absorb light or may reflect light.

Although in Embodiment 1 described above, the optical device is disposed in the window such that the longitudinal direction of projections 32 is the x axial direction, the present invention is not limited to this. For example, the optical device may be disposed in the window such that the longitudinal direction of projections 32 is the z axial direction.

Although in Embodiment 1 described above, each of the plurality of projections 32 constituting uneven structure portion 31 has a long length, the present invention is not limited to this. For example, the plurality of projections 32 may be disposed so as to scatter in a matrix, for example. That is, the plurality of projections 32 may be arranged in a dot pattern.

In Embodiment 1 described above, for example, each of the plurality of projections 32 has the same shape. However, the present invention is not limited to this, and the projections may have different shapes in one plane. For example, side faces 32a of the plurality of projections 32 in the upper half in the z axial direction of optical device 1 and side faces 32a in the lower half thereof may have different angles of inclination.

Although the plurality of projections 32 has a fixed height in, for example, Embodiment 1 described above, the present invention is not limited to this. For example, the heights of the plurality of projections 32 may vary randomly. This reduces the possibility that the light passing through the optical device looks like a rainbow in color. That is, the randomly different heights of the plurality of projections 32 average the wavelengths of minute diffracted light and scattered light at uneven interfaces and accordingly suppresses coloring of emitted light.

In Embodiment 1 described above, for example, materials containing high polymer molecules such as a polymer structure, other than liquid crystal materials may be used as the material for optical medium portion 34 of light distribution layer 30. The polymer structure is, for example, a mesh structure and the refractive index can be adjusted by disposing liquid crystal molecules in the polymer structure (between meshes). Examples of the liquid crystal material containing high polymer molecules include polymer dispersed liquid crystals (PDLCs) and polymer network liquid crystals (PNLCs).

Although Embodiment 1 described above gives an example in which the light entering optical device 1 is sunlight, the present invention is not limited to this. For example, the light entering optical device 1 may be light emitted by a light emitting device such as a luminaire.

Although optical device 1 is mounted on the indoor face of window 91 in Embodiment 1 described above, it may be mounted on the outdoor face of window 91. Mounting the optical device on the indoor face suppresses degradation of optical elements. Although optical device 1 is mounted on the window, it may be used as the window itself of architectural structure 90. Also, the use of optical device 1 is not limited to the case of being installed in window 91 of architectural, structure 90, and for example, the optical device may be installed in a window of a vehicle.

Note that these variations are also applicable to other embodiments and their variations.

Aside from the above, the present invention also includes forms obtained by applying various modifications conceivable by those skilled in the art to the above-described embodiments, and forms achieved by any combinations of structural elements and functions of each embodiment without departing from the scope of the present invention.

The invention claimed is:

1. An optical device, comprising:
a first substrate being light transmissive;
a second substrate opposing the first substrate and being light transmissive;
a light distribution layer disposed between the first substrate and the second substrate and distributing incident light; and
a first electrode and a second electrode that are disposed so as to sandwich the light distribution layer therebetween,
wherein the light distribution layer includes:
a first uneven structure portion having a plurality of first projections repeated in a first direction parallel to a main face of the first substrate; and
an optical medium portion containing a birefringent material and disposed to fill a plurality of recesses that are spaces between the plurality of first projections, and
a light blocking component that blocks at least part of incident light is disposed in the plurality of recesses, and
wherein the optical medium portion has a refractive index that changes upon application of a voltage between the first electrode and the second electrode, and
wherein each of the first electrode and the second electrode is in physical contact with each of the plurality of first projections.

2. The optical device according to claim 1,
wherein the light blocking component is disposed at bottoms of the plurality of recesses.

3. The optical device according to claim 2,
wherein a film thickness of the light blocking component at both ends in the first direction is greater than a film thickness of the light blocking component in a central portion in the first direction.

4. The optical device according to claim 1,
wherein a plurality of light absorbers absorbing incident light is dispersed in at least some of the plurality of first projections.

5. The optical device according to claim 1,
wherein at least one of a first side face and a second side face of each of the plurality of first projections is a scattering surface that scatters incident light, the first side face and the second side face intersecting with the first direction.

6. The optical device according to claim 5,
wherein the scattering surface has an anisotropic scattering property.

7. The optical device according to claim 5,
wherein a thin metal film is provided on the scattering surface.

8. The optical device according to claim 1,
wherein each of the plurality of first projections is a long projection extending in a second direction orthogonal to the first direction.

9. The optical device according to claim 8,
wherein bumps and dips repeated in the second direction are provided at tops of the plurality of first projections.

10. The optical device according to claim 8,
wherein the light distribution layer further includes a second uneven structure portion having a plurality of second projections repeated in the second direction, and each of the plurality of second projections is a long projection extending in the first direction.

\* \* \* \* \*